US010922989B2

(12) United States Patent
Ramanathan et al.

(10) Patent No.: US 10,922,989 B2
(45) Date of Patent: Feb. 16, 2021

(54) SYSTEMS AND METHODS OF EDUCATIONAL TOOLS IMPLEMENTED VIA SMART SPEAKERS

(71) Applicants: Aparna Nalinkumar Ramanathan, Menlo Park, CA (US); Deepak Ramanathan, Menlo Park, CA (US)

(72) Inventors: Aparna Nalinkumar Ramanathan, Menlo Park, CA (US); Deepak Ramanathan, Menlo Park, CA (US)

( * ) Notice: Subject to any disclaimer, the term of this patent is extended or adjusted under 35 U.S.C. 154(b) by 0 days.

(21) Appl. No.: 16/111,180

(22) Filed: Aug. 23, 2018

(65) Prior Publication Data

US 2020/0193852 A1 Jun. 18, 2020

Related U.S. Application Data

(60) Provisional application No. 62/549,066, filed on Aug. 23, 2017.

(51) Int. Cl.
*G09B 5/12* (2006.01)
*G09B 5/04* (2006.01)
*G06F 9/451* (2018.01)
*H04L 12/58* (2006.01)
*G10L 15/26* (2006.01)

(52) U.S. Cl.
CPC ............ *G09B 5/12* (2013.01); *G06F 9/453* (2018.02); *G09B 5/04* (2013.01); *G10L 15/26* (2013.01); *H04L 51/046* (2013.01)

(58) Field of Classification Search
CPC .. G09B 5/12; G09B 5/04; G06F 9/453; G10L 15/26; H04L 51/046
See application file for complete search history.

(56) References Cited

U.S. PATENT DOCUMENTS 9,509,799 B1\* 11/2016 Cronin .................... H04L 67/20
2017/0061018 A1\* 3/2017 Isaac ................... G06F 16/9535
2017/0339278 A1\* 11/2017 Wang .................. H04M 1/7255

\* cited by examiner

*Primary Examiner* — Corbett B Coburn

(57) ABSTRACT

In one aspect, a computerized process useful for implementing and managing an intelligent personal assistant (IPA) in an educational context, includes the step of providing an IPA. The IPA interacts with a set of users via one or more smart-speaker systems. The IPA causes the one or more smart-speaker systems to play an IPA message. The IPA message comprises an educational-related information to a set of parents of a student in an education institution. The IPA stores the IPA message for replay of the educational-related information in a student's home to the student or the student's parents. The method converts the educational-related information to an electronic mall format. The method electronically communicates the electronic mail formatted educational-related information to an electronic mail account of at least one parent of the student. The method implements an IPA dashboard, wherein the IPA dashboard enables the teacher to view and update the educational information.

14 Claims, 14 Drawing Sheets

SYSTEMS AND METHODS OF EDUCATIONAL TOOLS IMPLEMENTED VIA SMART SPEAKERS

CLAIM OF PRIORITY AND INCORPORATION BY REFERENCE

This application claims priority from U.S. Provisional Application No. 62/549,066, title SYSTEMS AND METHODS OF EMOTIONAL DEVELOPMENT EXERCISES WITH AN INTELLIGENT PERSONAL ASSISTANT and filed 23 Aug. 2017. This application is hereby incorporated by reference in its entirety for all purposes.

FIELD OF THE INVENTION

The invention is in the field of smart speakers and more specifically to a method, system and apparatus of educational tools implemented via smart speakers.

DESCRIPTION OF THE RELATED ART

Parental involvement with their children's education is a key factor for student educational success. Additionally, students can benefit from a continuity of information and activities between their school and home environments. At the same time, smart speakers enable interaction with a consistent cloud-based educational platform as the student's physical location changes. Accordingly, improvements to educational tools implemented via smart speakers are desired.

SUMMARY

In one aspect, a computerized process useful for implementing and managing an intelligent persona assistant (IPA) in an educational context, includes the step of providing an IPA. The IPA interacts with a set of users via one or more smart-speaker systems. The IPA causes the one or more smart-speaker systems to play an IPA message. The IPA message comprises an educational-related information to a set of parents of a student in an education institution. The IPA stores the IPA message for replay of the educational-related information in a student's home to the student or the student's parents. The method converts the educational-related information to an electronic mail format. The method electronically communicates the electronic mail formatted educational-related information to an electronic mail account of at least one parent of the student. The method implements an IPA dashboard, wherein the IPA dashboard enables the teacher to view and update the educational information.

Figure 1:
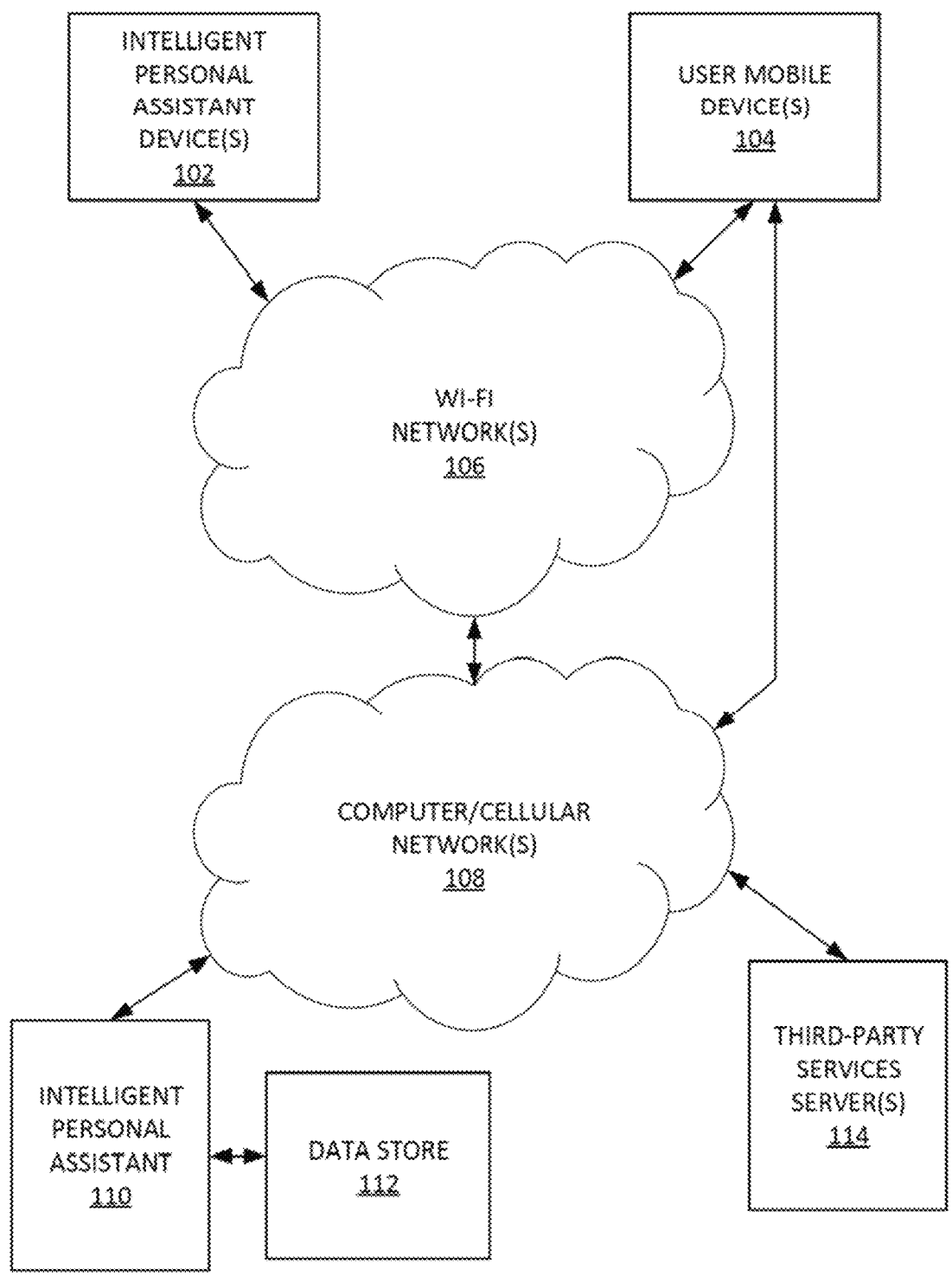
FIG. 1 illustrates an example system for emotional-development exercises with an intelligent personal assistant, according to some embodiments.

The Figures described above are a representative set and are not an exhaustive with respect to embodying the invention.

DESCRIPTION

Disclosed are a system, method, and article of manufacture for educational tools implemented via smart speakers. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Emotional quotient (EQ) can be a capacity to recognize and use emotional information. EQ is the capability of individuals to recognize their own and other people's emotions, discern between different feelings and label them appropriately, use emotional information to guide thinking and behavior, and manage and/or adjust emotions to adapt to environments or achieve one's goal(s). EQ can also be termed Emotional intelligence (EI).

Expert system can be a computer system that emulates the decision-making ability of a human expert.

Intelligent personal assistant (IPA) can be a software agent that can perform tasks or services for an individual. These tasks or services are based on user input, location awareness, and the ability to access information from a variety of online sources (such as weather or traffic conditions, news, stock prices, user schedules, retail prices, etc.). An IPA can perform ongoing tasks (e.g. schedule management) autonomously.

Learning to rank can be an application of machine learning to the ranking problem.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Mobile device can include a handheld computing device that includes an operating system (OS), and can run various types of application software, known as apps. Example handheld devices can also be equipped with various context sensors (e.g. biosensors, physical environmental sensors, etc.), digital cameras, WI-Fi, Bluetooth, and/or GPS capabilities. Mobile devices can allow connections to the Internet and/or other Bluetooth-capable devices, such as an automobile, a wearable computing system and/or a microphone headset. Exemplary mobile devices can include smart phones, tablet computers, optical head-mounted display (OHMD) (e.g. Google Glass®), virtual reality head-mounted display, smart watches, other wearable computing systems, etc.

Natural language processing (NLP) is the field of computer science concerned with human speech as it is spoken.

Security Assertion Markup Language (SAML) is an XML-based, open-standard data format for exchanging authentication and authorization data between parties, in particular, between an identity provider and a service provider.

Speech Synthesis Markup Language (SSML) is an XML-based markup language for speech synthesis applications. It is a recommendation of the W3C's voice browser working group. SSML can be embedded in VoiceXML scripts to drive interactive telephony systems.

Smart speaker can be a wireless speaker and smart device systems. Smart speaker can utilize various features and/or application available across a number of services and platforms, peer-to-peer connection through mesh networking, intelligent personal assistants, and others. A smart speaker can have a designated interface and features in-house, usually launched or controlled via a mobile-device application and/or home automation software.

Subscription box can be a recurring, physical delivery of niche products packaged as an experience and designed to offer additional value on top of the actual retail products contained in a box. Subscription boxes can be a method of product distribution.

Swept Frequency Capacitance (SFC) sensing can be a form of capacitive touch-sensing technology that can monitor signals across a broad range of signals, which would make it possible for the object to not only sense the touch itself, but also to recognize a wide range of complex motions and configurations of the person touching it.

Example Computer Architecture and Systems

FIG. 1 illustrates an example system 100 for emotional-development exercises with an intelligent personal assistant, according to some embodiments. System 100 can be a platform to improve well-being, emotional intelligence skills, communication skills, connection/emotional closeness. This platform can be used as a buffer against rising trend of depression and anxiety and to increase psychological well-being, resilience and flexibility to thrive through change. The platform can tie together multiple individual products to form a unique method and system within any household. The system of products can combine various areas, including inter alia: research-supported psychological techniques; science of body and mind; gamification using behavioral economic theory; learning and development theory; technology designed for purpose; etc.

IPA device 102 can provide users access and/or manage interaction with an IPA system. IPA system can implement a set of expert systems, intelligent agents, calendaring systems, shopping assistants, game systems, calculators, knowledge navigators (e.g. software agents that can search for information, etc.), Natural language processing systems, etc. IPA 102 can include a dialog system of automated online assistants is to translate the human-generated input into a digital format that the automated online assistant can use for further processing by its expert system, as well as interpret whatever solutions or replies it generates back to what a human user understands, and optimally in a way as natural and user-friendly. Examples of IPA device 102 can include, inter alia: Amazon Alexa®, Amazon Echo®, Google Home®, etc. In some example embodiments, IPA device 102 can be a smart speaker.

Wi-Fi network(s) 106 can include various local short-range networks (e.g. Wi-Fi, Bluetooth®, other LAN types, etc.). Computer/Cellular networks 108 can include the Internet, text messaging networks (e.g. short messaging service (SMS) networks, multimedia messaging service (MMS) networks, proprietary messaging networks, instant messaging service networks, email systems, cellular data networks, etc. Computer/Cellular networks 108 can be used to communicate messages and/or other information (e.g. videos, tests, articles, other educational materials, etc.) from the various entities of system 100.

IPA server(s) 110 can include various functionalities, applications and/or systems for implementing/servicing an IPA system. IPA server 110 can manage the IPA system presented via IPA device 102. IPA server 110 can manage various applications implemented on IPA device 102. In various embodiments, all or a portion of an IPA system can be implemented in IPA server 110. Data acquired by IPA server(s) 110 and/or IPA system can be stored in data store 112.

Third-party server(s) 114 can provide additional services (e.g. database servers, mapping services, e-commerce services, educational services, multimedia on-demand services, etc.).

Figure 2:
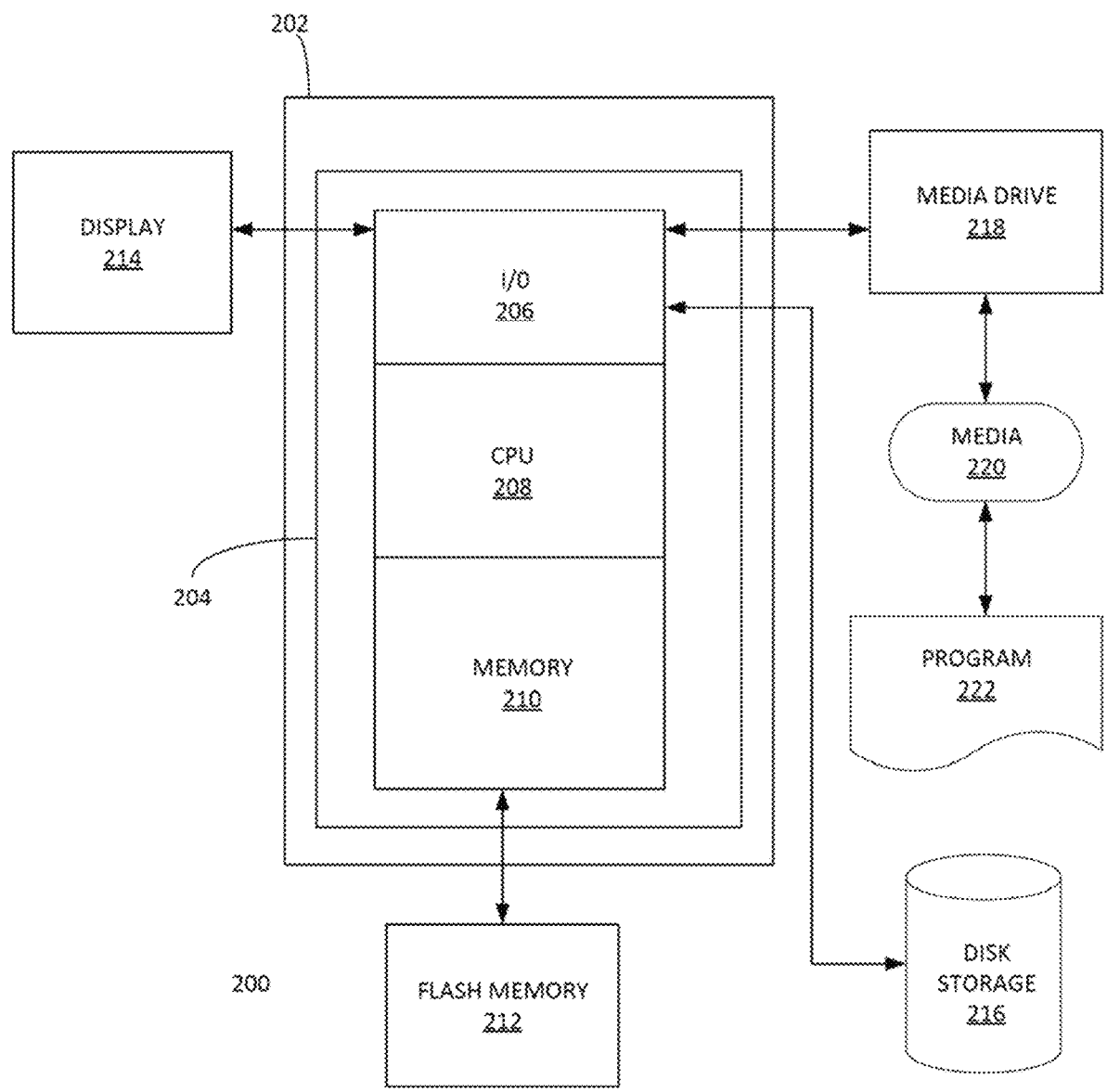
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
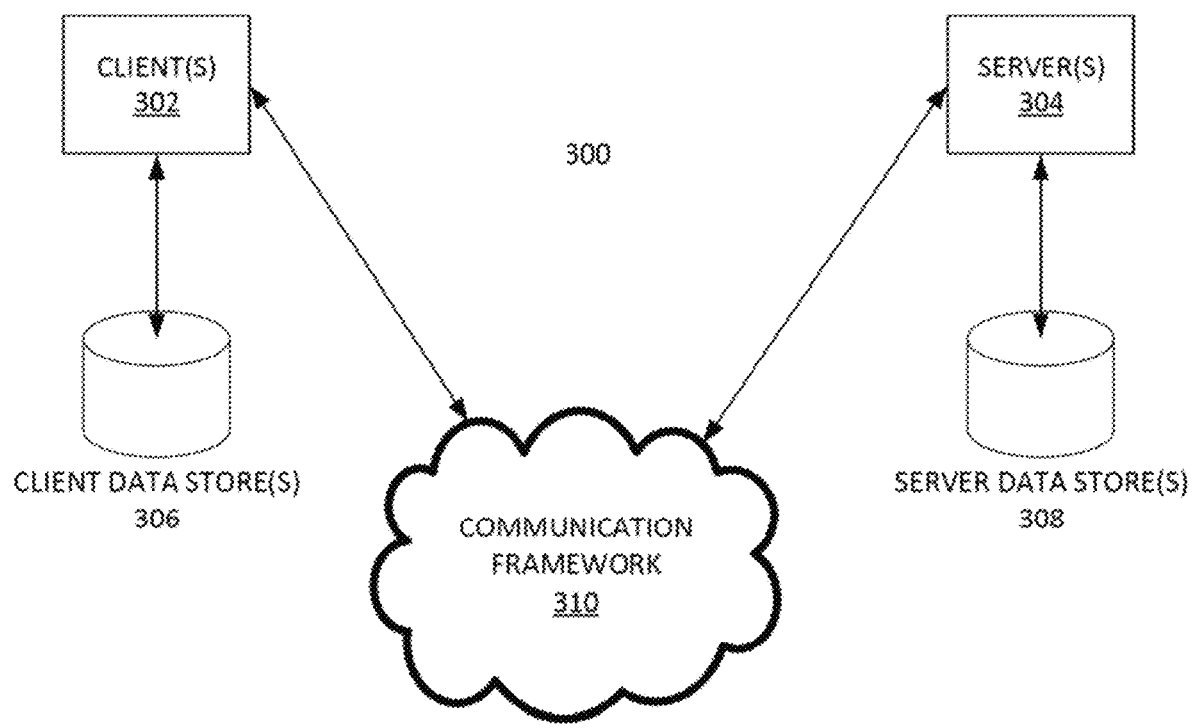
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Figure 4:
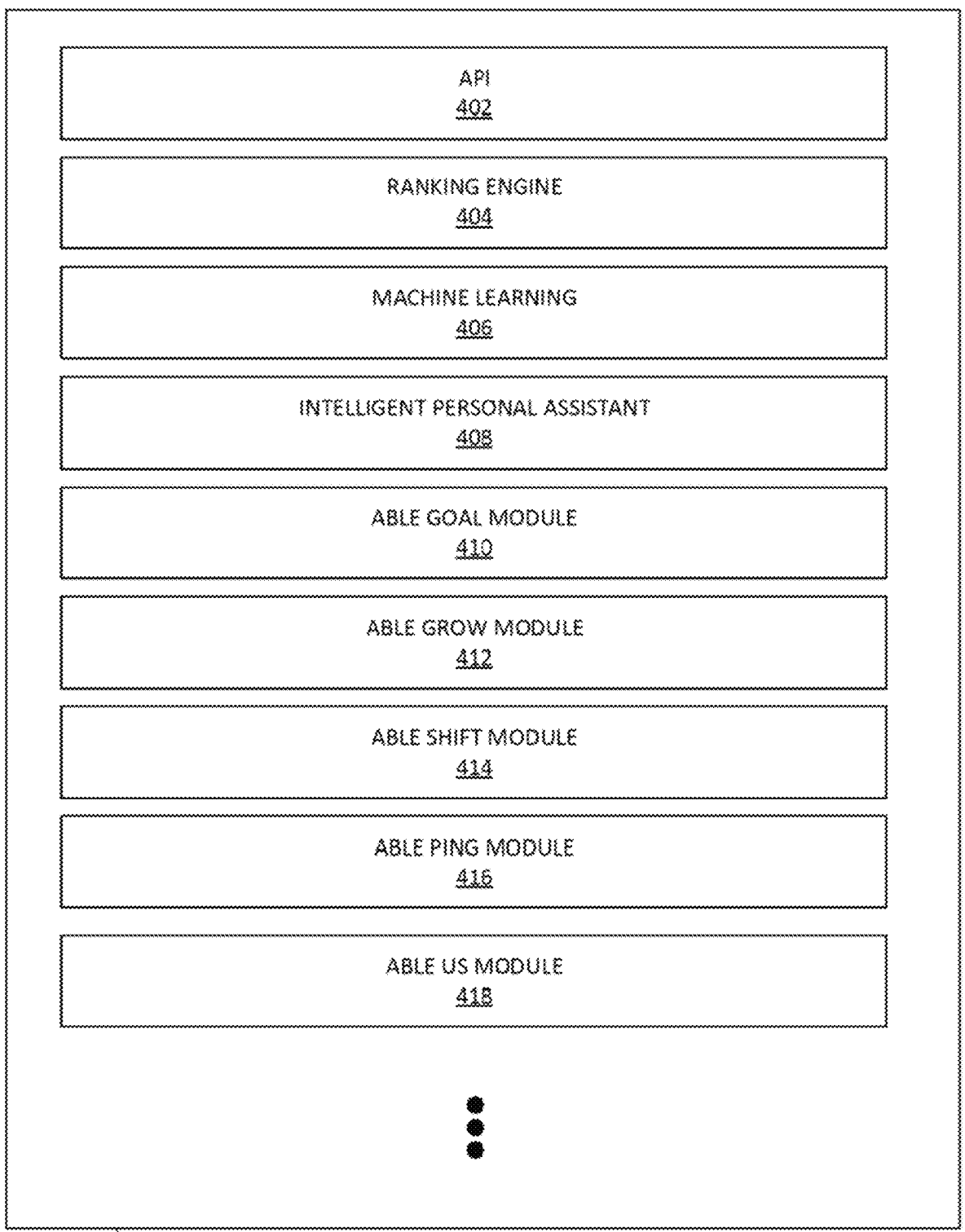
FIG. 4 illustrates an example an IPA emotional-intelligence development platform for implementing, according to some embodiments, an IPA emotional-intelligence development platform be used to build emotional intelligence for both family and individual's well-being.
Figure 5:
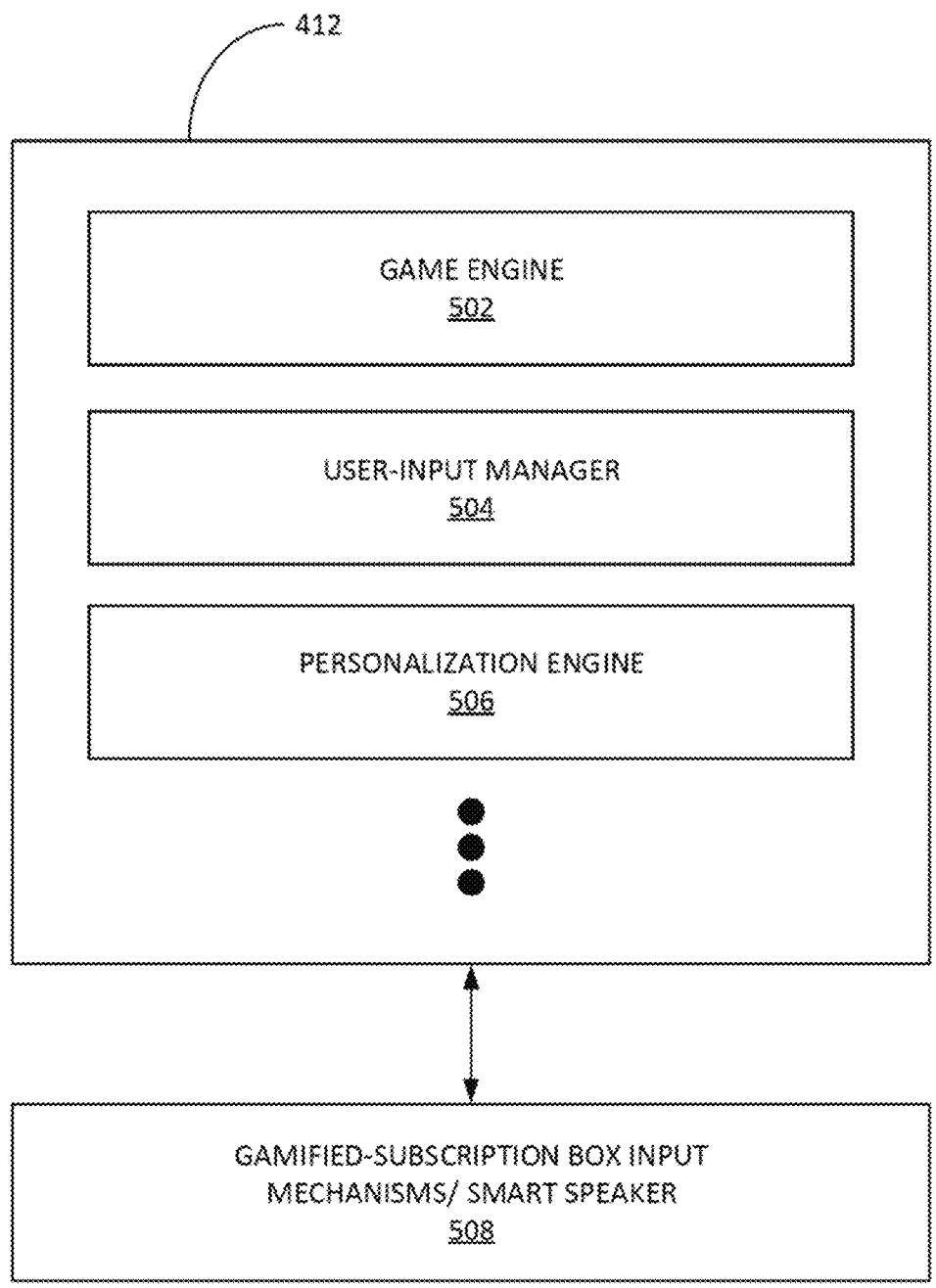
FIG. 5 illustrates an example Able grow module, according to some embodiments.

FIG. 4 illustrates an example an IPA emotional-intelligence development platform 400 for implementing, according to some embodiments, an IPA emotional-intelligence development platform 400 be used to build emotional intelligence for both family and individual's well-being. IPA emotional-intelligence development platform 400 can be used to improve well-being, emotional intelligence skills, communication skills and/or connection/emotional closeness. IPA emotional-intelligence development platform 400 can be used to buffer against rising trend of depression and anxiety. IPA emotional-intelligence development platform 400 can be used to increase psychological well-being, resilience and flexibility to thrive through change. IPA emotional-intelligence development platform 400 can include an integrated system of products (e.g. as provided infra, etc.). IPA emotional-intelligence development platform 400 can tie together multiple individual products to form a method and system within a household. IPA emotional-intelligence development platform 400 can include various applications, games, learning aids, etc. Accordingly, in some examples, IPA emotional-intelligence development platform 400 can focus on various areas, including, inter alia: research-supported psychological techniques, science of body and mind, gamification using behavioral economic theory, learning and development theory and/or technology designed for purpose. FIG. 5 provides a chart illustrating these example attributes developed using IPA emotional-intelligence development platform 400, according to some embodiments.

In some example embodiments, IPA emotional-intelligence development platform 400 can be implemented using a smart speaker. As used herein, a smart speaker can be a type of wireless speaker and smart device that utilizes Wi-Fi, Bluetooth and other standards to extend usage beyond audio playback. This can include, but not be limited to, features such as compatibility across a number of services and platforms, peer-to-peer connection through mesh networking, intelligent personal assistants, and others. Each can have its own designated interface and features in-house, usually launched or controlled via application or home automation software.

Returning to FIG. 4, API module 402 can provide users access and/or manage interaction with an IPA system. API 402 be used by other programs/systems to interact with system 400 and/or its modules. Ranking engine 404 can implement search-engine optimization. Ranking engine can leverage machine-learning module to implement a learning to rank algorithm optimizations.

Modules 410-418 can operate individually and/or be integrated together in various permutations. In some examples, modules 410-418 can be implemented without the IPA emotional-intelligence development platform 400 (e.g. implemented via a mobile-device application, etc.). Modules 410-418 can utilize a third-party voice-activated platform that is implemented via a smart speaker system. Various examples of integration of modules 510-518 within a IPA emotional-intelligence development platform 400 are provided herein. Users can enable techniques and interventions from a monthly subscription box so they are accessible on smart speaker device. Techniques from any source can be set as goals and tracked using a Goal Tracker system. Modules 410-418 can communicate and can be integrated through unified backend databases. Additional information regarding modules 410-418 is provided infra.

System 100 can utilize machine learning techniques (e.g. artificial neural networks, etc.) to implement module shape recognition module 102 and computer-vision/OCR module 106, etc. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter olio: decision tree learning, association rule learning, artificial neural networks, inductive logic programming, support vector machines, clustering, Bayesian networks, reinforcement learning, representation learning, similarity and metric learning, and/or sparse dictionary learning. Machine learning operations can be implemented by machine-learning module 406 of IPA emotional-intelligence development platform 400.

It is noted that IPA emotional-intelligence development platform 400 can include various other functionalities and/or systems, such as, inter alia: search engines, voice recognition, voice-to-text, database management systems, calculators, statistical engines, etc.

Modules 410-418 utilize/implement products that can work individually and/or can also be integrated together in various permutations. In some embodiments, modules 412-418 can work without an Able shift device 800 (see infra). Modules 410-418 can leverage a third-party voice-activated platform (e.g. the Amazon Alexa®, Google Home®, other smart speaker systems, etc.). Within the system, users can enable techniques and interventions from module 412 (e.g. using a monthly subscription box, etc.) so they are accessible on Able shift device 800. Techniques from any source can be set as goals and tracked on a Goal Tracker system/device. As shown in FIG. 1, all the systems implemented by modules 410-418 can communicate and are integrated through unified backend databases.

FIG. 5 illustrates an example Able grow module 412, according to some embodiments. Able grow module 412 can manage gamified-subscription box to start conversations on emotional intelligence. The gamified-subscription boxes can be delivered on a periodic basis (e.g. monthly, weekly, etc.) and/or on-demand. The gamified-subscription boxes can include voice-based introductions, interaction, personalization and/or information. Within the wellness and health space, each box is centered around a relevant emotional intelligence theme (e.g. sleep, self-control, etc.). The gamified-subscription boxes can increase self-awareness through teaching the science of players' minds, bodies and emotions. The gamified-subscription boxes can increase self-management through scientifically validated well-being, emotional intelligence, communication, connection and broader life skills. The gamified-subscription boxes can curate skills from multiple disciplines/fields, such as, inter alia, neuroscience, positive psychology, psychology and mindfulness Interactive experience delivered via stories and/or games and voice, built on behavioral science. The gamified-subscription boxes can implement learning through multimodal experience that combines, inter alia: visual-based learning (e.g. reading material, photos, etc.); tactile-based learning (e.g. fidgets, sensory 'clues', etc.); olfactory-based learning (e.g. sensory 'clues' etc.); sound-based learning (see infra in voice-triggered technology, etc.) The power of the narrative stimulates emotions, and these emotional responses influence learning and behavior. The gamified-subscription boxes can enable immersion into a character in a movie, and thus, increases empathy. This can allow the viewer to live the experiences of the character without having to experience the real-life consequences. The gamified-subscription boxes can include voice-triggered technology (e.g. using smart-speaker applications, etc.). Skills can be developed using gamified-subscription box applications available through a voice-activated technology platform. Users can initiate interaction by voice (e.g. specifically requesting an application and/or skill). The gamified-subscription boxes can provide user interactivity based on a game engine included in Able grow module 412. The game engine 502 can provide choices on which path to follow through a game or other lesson. Able grow module 412 can include can include a user-input manager to manage user input. Able grow module 412 can include a personalization engine 506 for users. Personalization engine 506 can manage the retention of user-specific data. Personalization engine 506 can track progress and implementation of the learnt skill. In example of a gamified-subscription box a parent and child can sit together for ten to fifteen (10-15) minutes, for four to five (4 to 5) sessions per month. Each gamified-subscription box can be all inclusive. In this way, there is little to no need to plan and organize. Gamified-subscription box can include screen-based devices and/or other devices for outputting digital information. Gamified-subscription box can include user input devices 506 (e.g. touch screen devices, microphones, etc.) and/or couple with other devices (e.g. smart speakers, mobile devices, etc.) to obtain user input.

Educational Applications

It is noted that the systems and methods provided supra can be modified for educational contexts. In some examples, the systems and methods can be seamlessly integrated between home environments, educational setting, therapy/health care settings and/or business settings.

For example, systems 100 and 400 can provide SEL/transitions in class to support teachers with student development and/or class management. Accordingly, academic content can be delivered in a unique way via smart-speaker systems.

Figure 6:
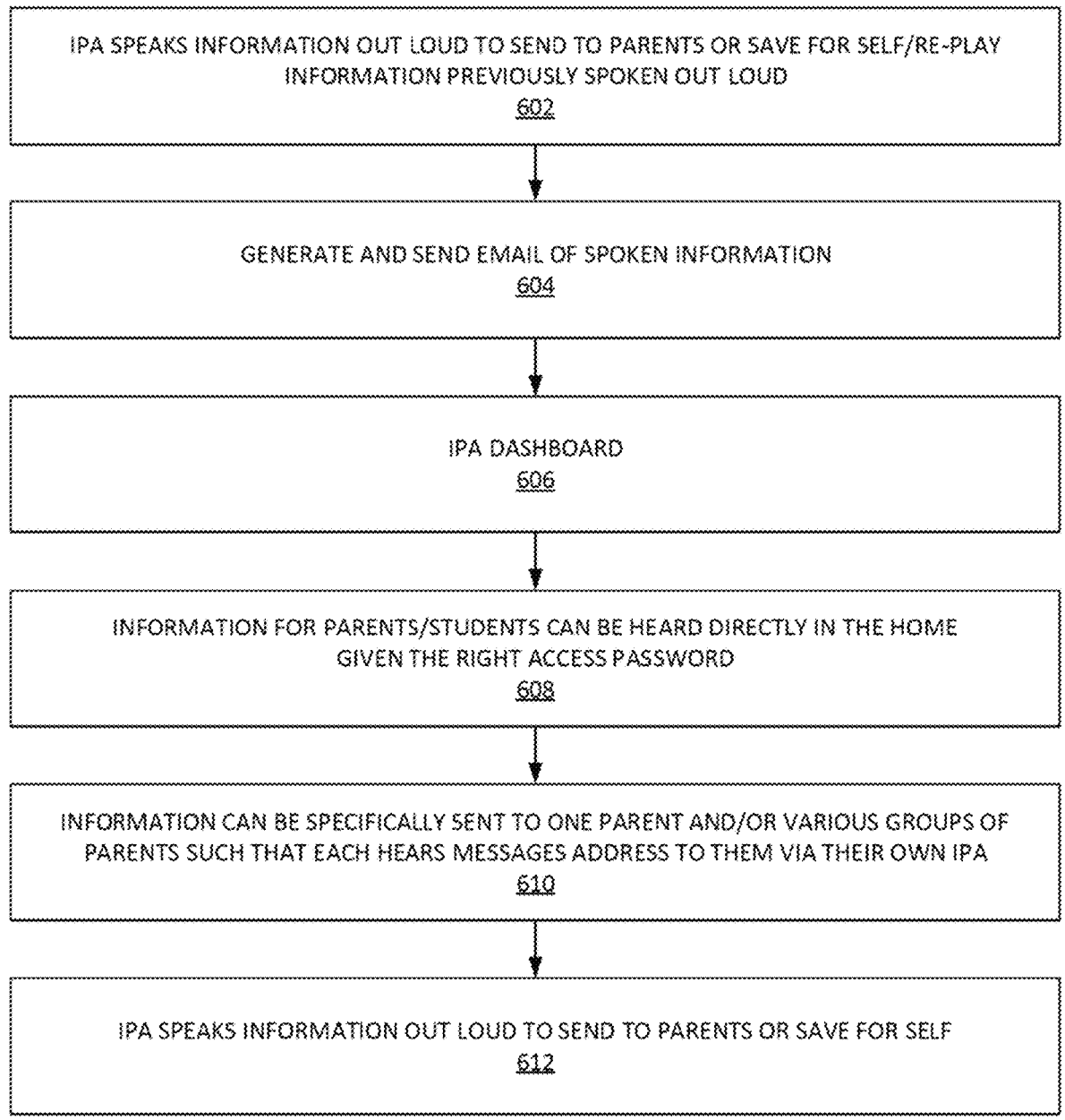
FIG. 6 illustrates an example process implementing an IPA in an educational context, according to some embodiments.

FIG. 6 illustrates an example process 600 implementing an IPA in an educational context, according to some embodiments. In step 602, process 600 can IPA speaks information out loud to send to parents or save for self/re-play information previously spoken out loud. In step 604, process 600 can generate and send email of spoken information.

In step 606, process 600 can implement an IPA dashboard. For example, the IPA dashboard can enable a teacher to view and/or update information. Using the IPA dashboard, the teach can perform various actions such as, inter alia: IPA message deletions, IPA message edits, assign tasks to specific parents or teachers or school staff, generate and/or listen to emails, share tasks/information on other 3rd party platforms and/or modify external calendars.

In step 608, information for parents/students can be heard directly in the home given the right access password. In step 610, process 600 can information can be specifically sent to one parent and/or various groups of parents such that each hears messages address to them via their own IPA. In step 612, process 600 can provide feedback that information has been heard by the parent is delivered to the teacher's IPA dashboard.

Figure 7:
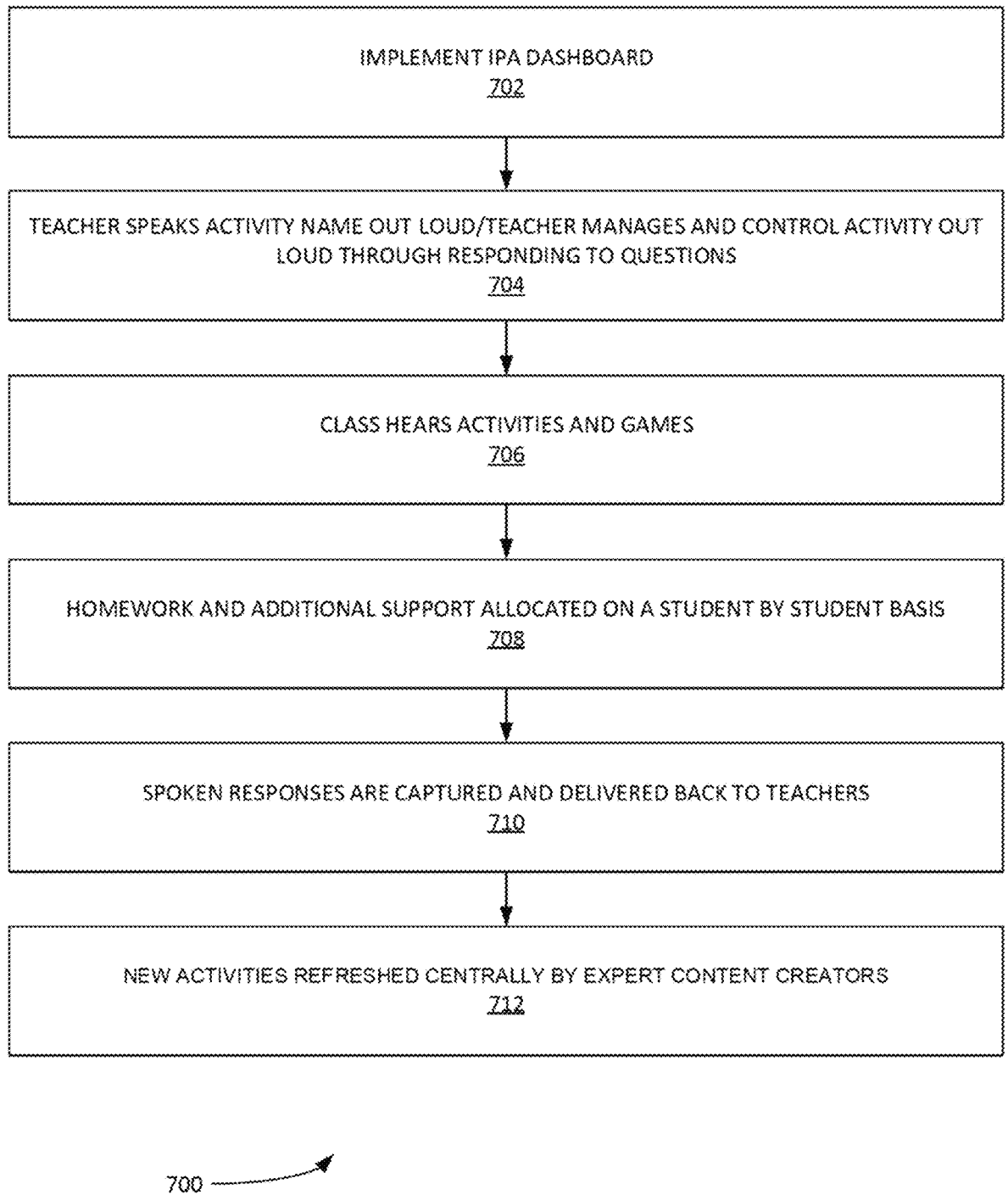
FIG. 7 illustrates another example process of implementing an IPA in an educational context, according to some embodiments.

FIG. 7 illustrates another example process 700 of implementing an IPA in an educational context, according to some embodiments. Process 700 can improve how various emotional, social and/or academic learning and transition activities and games are delivered via an IPA functionality. In step 702, process 700 can implement an IPA dashboard. With the IPA dashboard, the teacher can view all possible activities, favorite activities for a teacher's classroom, view supporting visual and video aids, create class specific content based on standard templates.

In step 704, teacher can speak an activity name out loud. In this way, the teacher manages and controls educational activity out loud. In step 706, class hears activities and games. In step 708, homework and additional support can be allocated on a student by student basis. In step 710, student/parent spoken responses can be captured and delivered back to teachers. In step 712, new activities can be refreshed centrally by various expert content creators.

SSML can be utilized in some embodiments. For example, a Text to Automated SSML Generator can be provided. SSML is the format can be utilized by an IPA voice-activated device utilize to process regular text or spoken word into a format that the voice interactive can read out loud. In some examples, the conversion between text to SSML such that the SSML sounds close to human spoken words and not like a robot. The Text to Automated SSML Generator can provide a method and tool that can takes text input, such as a paragraph, and then using a series of drop down menus, automatically modifies the original string to include SSML tags so that the output can sound more human-like with variations in pitch, tone, speed, emphasis and language.

Figure 8:
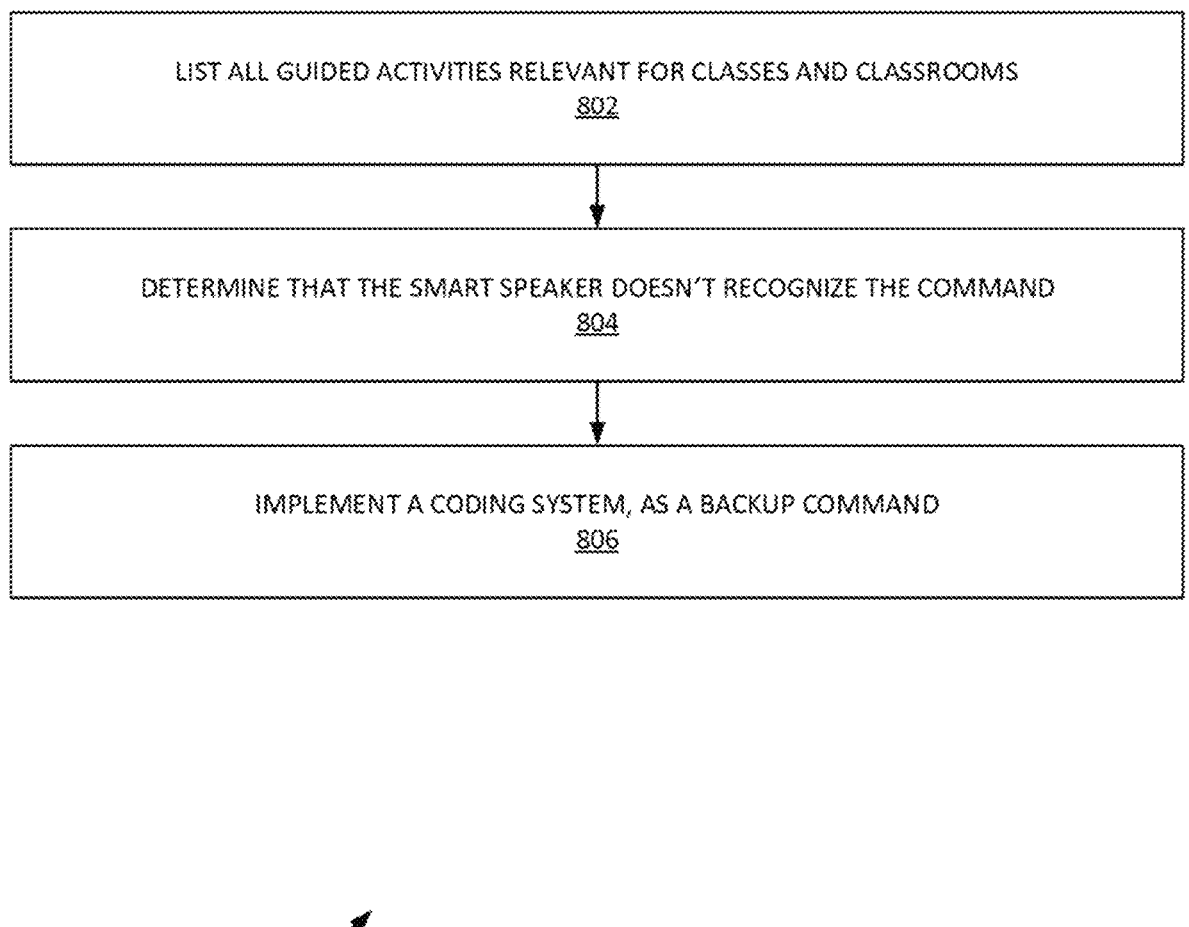
FIG. 8 illustrates an example process for provide a teacher a list of possible commands for smart speakers in an educational context, according to some embodiments.

FIG. 8 illustrates an example process 800 for provide a teacher a list of possible commands for smart speakers in an educational context, according to some embodiments. In step 802, process 800 can list all guided activities relevant for classes and classrooms. A web application (and/or mobile application) can display the list (e.g. see FIG. 9 infra). After a command is stated, step 802 can then encode the activity into SSML and communicate this activity to the smart speaker.

Process 800 can provide guided activity using a set of voice design principles to ensure the activities are engaging and effective in a classroom. Each activity can have a categorization by, inter alia: length in time, subject, grade level, and educational benefit. This categorization is provided for usage in the classroom. Process 800 can implement an automated preview, so that without having to speak the command to Alexa, the user can hear the first thirty (30) seconds of the interaction with the smart-speaker system.

Figure 9:
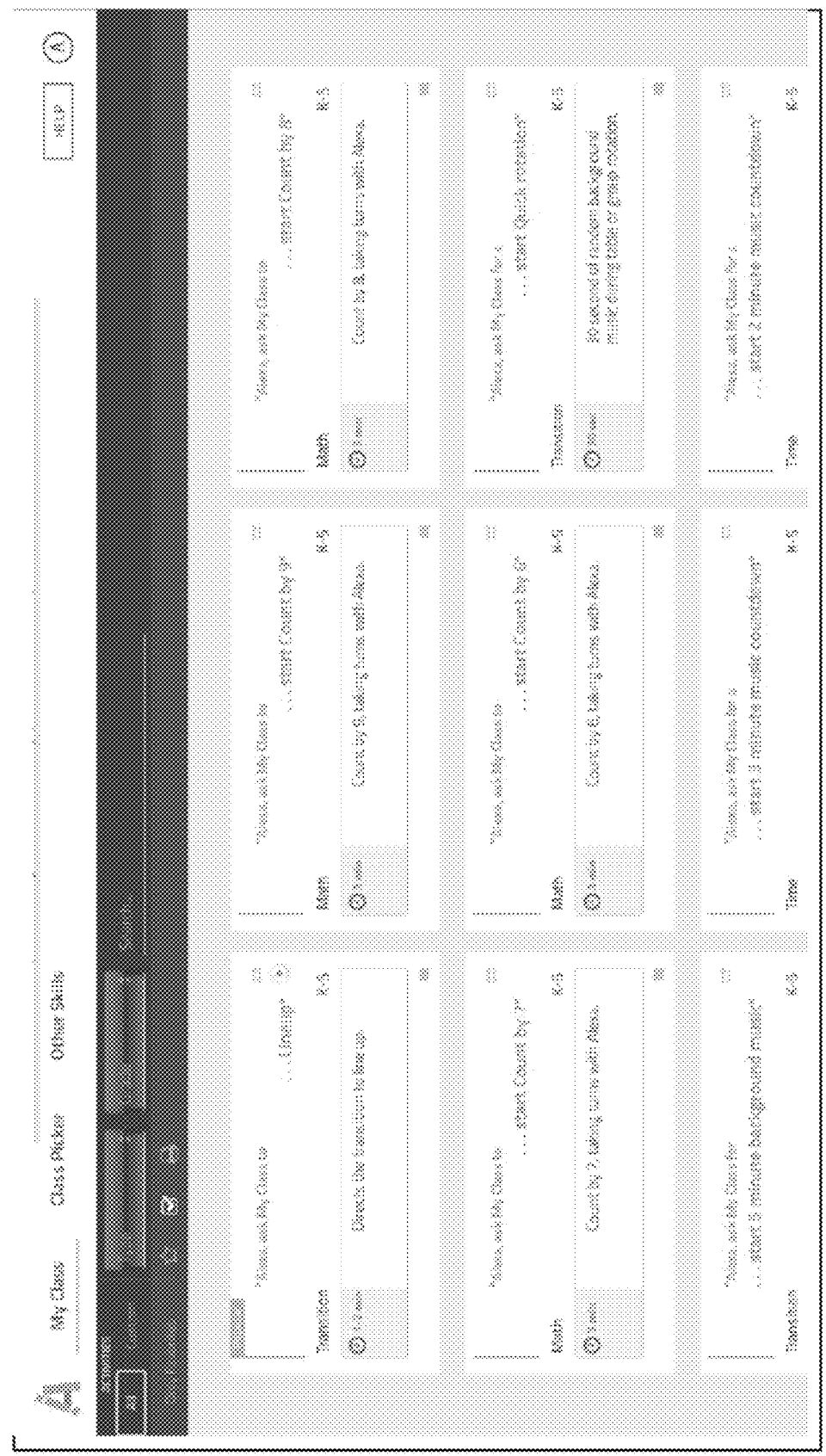
FIG. 9 illustrates an example web display provided by process 800, according to some embodiments.

In step 804, process 800 can determine that the smart speaker doesn't recognize the command. In step 806, process 806, can implement a coding system, as a backup command, so that each activity can be launched with an alphanumeric sequence. Additionally, a failsafe mechanism for commands that are not well understood can be provided by passing that command to a tool that can recognize the command using a score based natural language processing match. FIG. 9 illustrates an example web display 900 provided by process 800, according to some embodiments.

Figure 10:
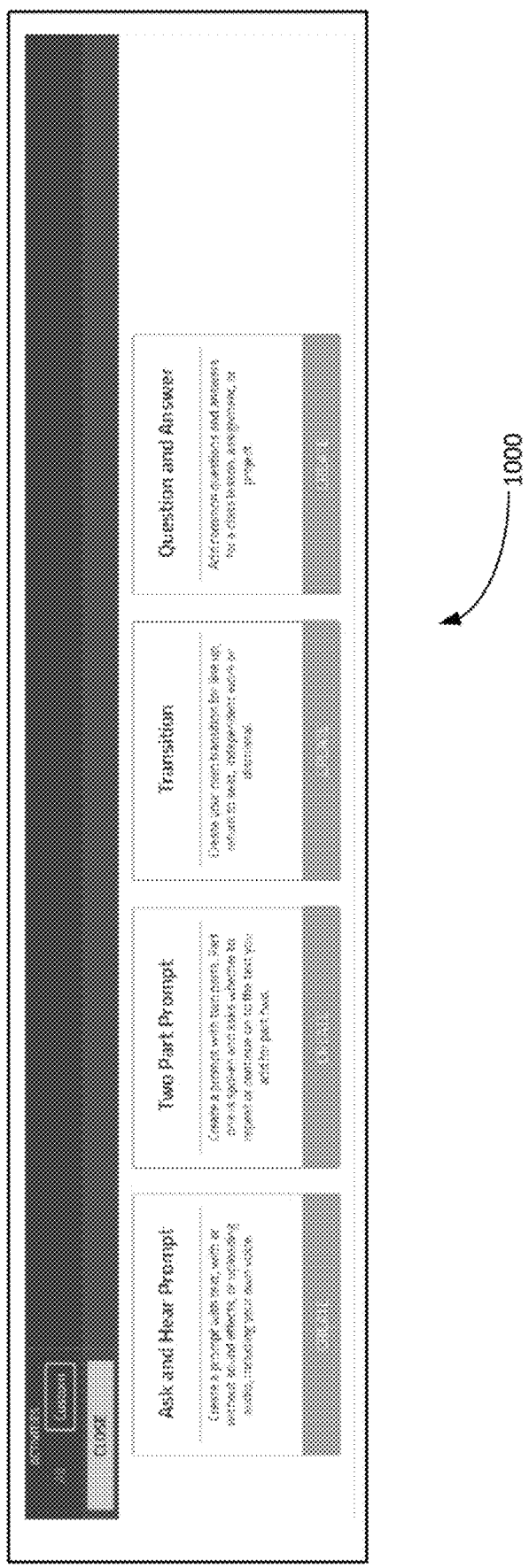
FIG. 10 illustrates a flow for way for a teacher to create a custom activity and make said custom activity available to a smart speaker device, according to some embodiments.

FIG. 10 illustrates a flow 1000 for way for a teacher to create a custom activity and make said custom activity available to a smart speaker device, according to some embodiments. Teachers can create their own custom activities. These custom activities can be formatted and made available on the teacher's smart speaker device in a short period of time (e.g. less than a minute) Various ways to add custom activities based on formats that are required by educators can be provided via a web/mobile device application. These can include, inter alia: the ability to create a response based on a request or command, the ability to create an interactive response that goes back and forth one or several times, the ability to use a template to create their own transition activities, the ability to upload a text document with questions and answers and then have uses ask our platform a question and then have that response answered back, the ability to add a quiz with time delay before the answer is provided or an interactive quiz requiring the answer to be spoken to the smart speaker, a tool to create class briefings each day with pre-set topics that are automatically populated each day, such as news, weather, jokes, word of the day, etc.

Users can also share the custom activities that they have developed with other users. In this way, a set of users can hear the same activity on their respective smart-speaker systems. Users can also make their activity publicly available for other users to add to their own dashboard of activities. These can be shared in an online voice-activity marketplace.

If a smart speaker speaks a word incorrectly, a tool can be provided for a user to report this mispronunciation to an online administrative entity that can then automatically improve and update the encoding so that the word would be pronounced better in the future. Each of the guided activities can be set with a customizable name, so that the command is familiar to the user.

Figure 11:
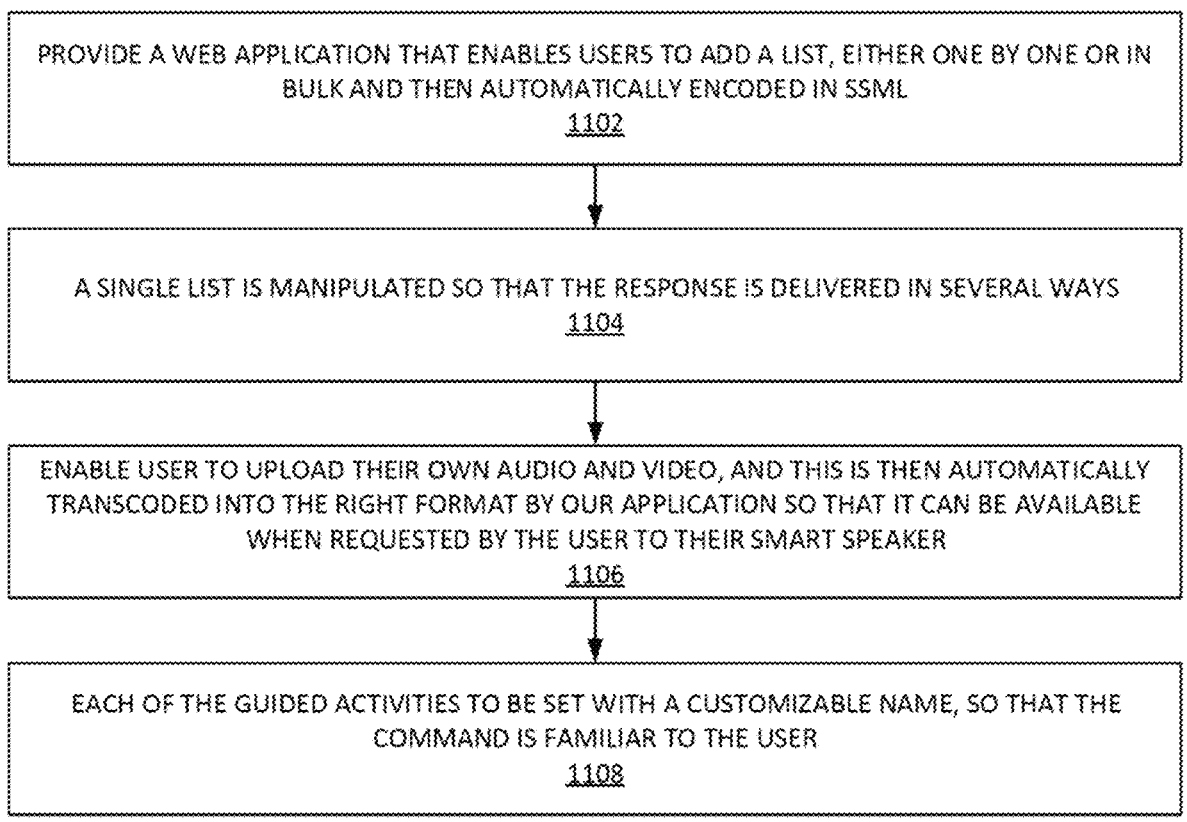
FIG. 11 illustrates an example process for users to add a list of items and then have the smart speaker speak one or more items back randomly, according to some embodiments.

FIG. 11 illustrates an example process 1100 for users to add a list of items and then have the smart speaker speak one or more items back randomly, according to some embodiments. In step 1102, process 1100 can provide a web application that enables users to add a list, either one by one or in bulk. These lists can then be automatically encoded in SSML in this way, the list can be made ready for a voice application to send a random item when a request is made. Upon each request, a new item can be randomly picked until every item in the list is randomly picked. After which the item list is reset so that all items are available to be picked.

In step 1104, a single list can be manipulated so that the response can be delivered in several ways (e.g. two items grouped, a random sequence of all items, etc.). For example, if there are list of names added, our software can randomly group this list of names, which is then spoken back through the smart speaker.

Figure 12:
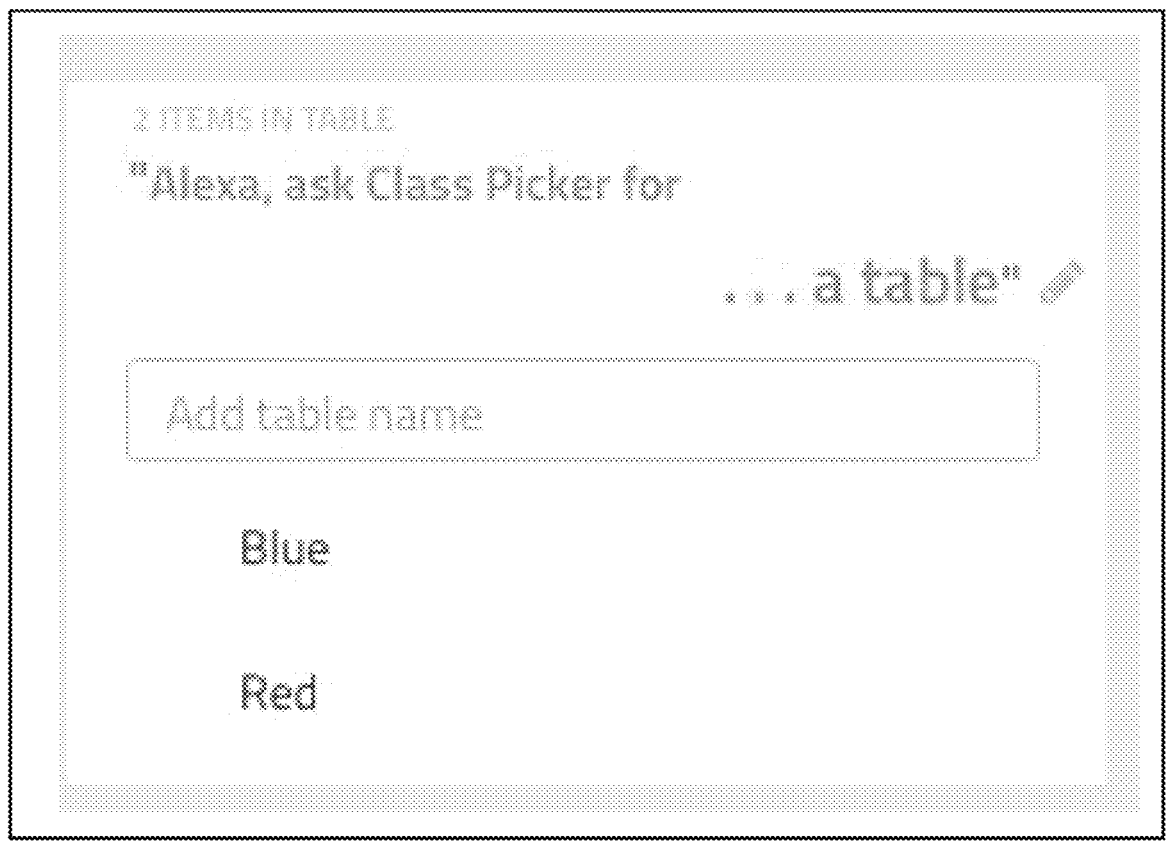
FIG. 12 illustrates a screen shot of a web application implementing process 1100, according to some embodiments.

In step 1106, process 1100 can enable the user to upload their own audio and video, and this is then automatically transcoded into the right format by our application so that it can be available when requested by the user to their smart speaker. In step 1108, each of the guided activities to be set with a customizable name, so that the command is familiar to the user. FIG. 12 illustrates a screen shot of a web application implementing process 1100, according to some embodiments.

Figure 13:
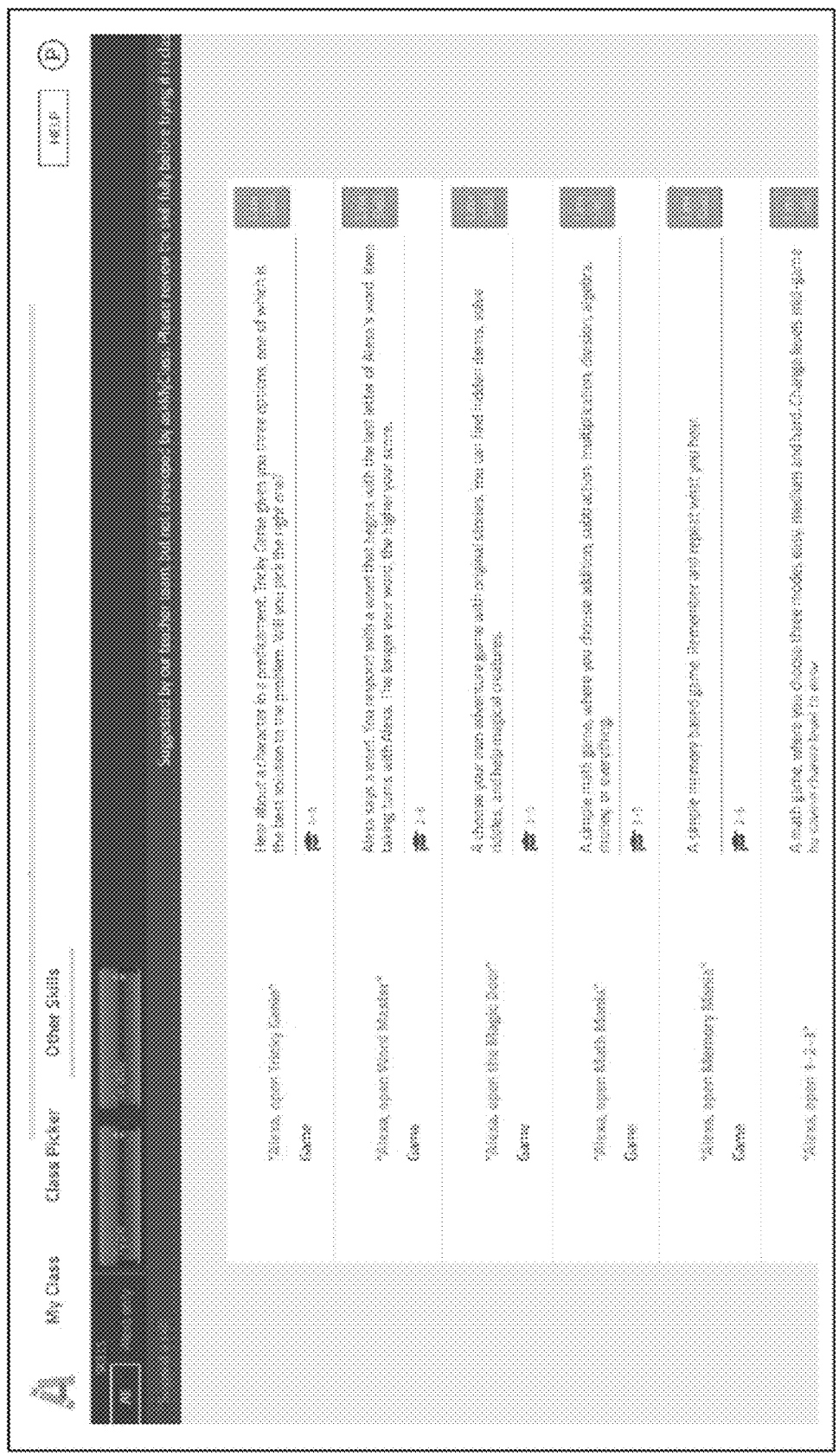
FIG. 13 illustrates an example screen shot showing a curated lists of available smart-speaker skills that are ready for a classroom, according to some embodiments.

FIG. 13 illustrates an example screen shot 1300 showing a curated lists of available smart-speaker skills that are ready for a classroom, according to some embodiments. A smart-speaker system can enable curating of generally available smart-speaker skills. The smart-speaker system can evaluate various factors, inter alia: grade appropriateness, popularity, learning benefit, and several other factors. A web application can display these curated lists, so users can easily locate and use available smart-speaker skills that are ready for the classroom.

Figure 14:
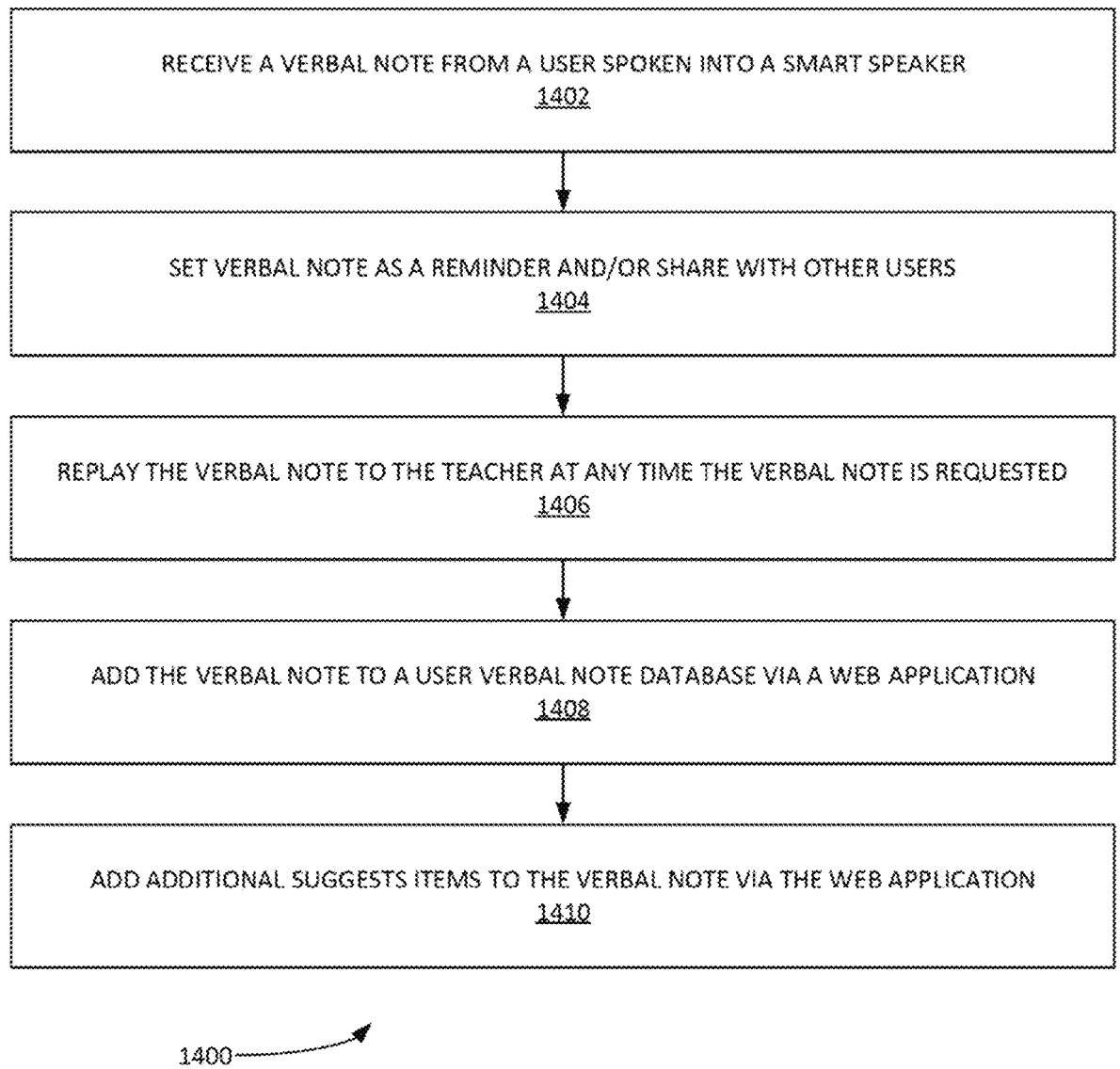
FIG. 14 illustrates an example process for educators to capture information quickly using their voice, according to some embodiments.

FIG. 14 illustrates an example process 1400 for educators to capture information quickly using their voice, according to some embodiments. In step 1402, process 1400 can receive a verbal note from a user spoken into a smart speaker. For example, the verbal note can be of around twenty (20) words. The verbal note can be converted into text added to our web application. In step 1404, when a note is added, a teacher can set it as a reminder, have it sent to another user (e.g. a parent, a student, a school administrator, etc.) and/or have the verbal noted saved privately. The verbal note sent to the user's email inbox. In step 1406, process 1400 can replay the verbal note to the teacher at any time the verbal note (and/or other verbal notes are requested). In step 1408, process 1400 can add the verbal note via our web application, as well as, encodes the verbal note to be played back via a request to the smart speaker. In step 1410, process 1400 can add additional suggests items to the verbal note via the web application, such as, inter alia: activities that they have used and played that day. This then makes it very easy for the educator to send information to the student's home (e.g. a parent's smart speaker, a parent's email, MMS message to a parent, etc.).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized process useful for implementing and managing an intelligent personal assistant (IPA) in an educational context, comprising:
providing an IPA, wherein the IPA interacts with a set of users via one or more smart-speaker systems, wherein the IPA causes the one or more smart-speaker systems to play an IPA message, wherein the IPA message comprises an educational-related information to a set of parents of a student in an education institution, wherein the IPA stores the IPA message for replay of the educational-related information in a student's home to the student or the student's parents, and;
converting the educational-related information to an electronic mail format;
electronically communicating the electronic mail formatted educational-related information to an electronic mail account of at least one parent of the student; and
implementing an IPA dashboard, wherein the IPA dashboard enables the teacher to view and update the educational information.

2. The computerized method of claim 1, wherein the educational-related information is spoken by a teacher in the educational institution.

3. The computerized method of claim 2 further comprising:
using the IPA dashboard, the teacher can create the IPA message, delete the IPA message, and perform an IPA message edits.

4. The computerized method of claim 3, wherein the teacher can use the IPA dashboard to assign tasks to specific parents or other teachers or school staff, to listen to other IPA messages generated by parents, to share education tasks to third-party platforms and to modify an educational calendars of a student.

5. The computerized method of claim 4 further comprising:
providing a feedback message to the teacher that the educational information has been played by the IPA to at least one parent.

6. The computerized method of claim 3, wherein the IPA requires the at least one parent of the student to speak a specified password or pass phrase to access the IPA message via a parent's smart speaker system.

7. The computerized method of claim 6, wherein the feedback message is delivered to the teacher's IPA dashboard.

8. A computerized system implementing an intelligent persona assistant (IPA) in an educational context, comprising:
at least one processor configured to execute instructions;
a memory containing instructions when executed on the processor, causes the at least one processor to perform operations that:
provide an IPA, wherein the IPA interacts with a set of users via one or more smart-speaker systems, wherein the IPA causes the one or more smart-speaker systems to play an IPA message, wherein the IPA message comprises an educational-related information to a set of parents of a student in an education institution, wherein the IPA stores the IPA message for replay of the educational-related information in a student's home to the student or the student's parents, and;
convert the educational-related information to an electronic mail format;
electronically communicate the electronic mail formatted educational-related information to an electronic mail account of at least one parent of the student; and
implement an IPA dashboard, wherein the IPA dashboard enables the teacher to view and update the educational information.

9. The computerized system of claim 8, wherein the educational-related information is spoken by a teacher in the educational institution.

10. The computerized system of claim 9, wherein the memory contains instructions that when executed on the processor, causes the at least one processor to perform operations that:
 use the IPA dashboard, the teacher can create the IPA message, delete the IPA message, and perform an IPA message edits.

11. The computerized system of claim 10, wherein the teacher can use the IPA dashboard to assign tasks to specific parents or other teachers or school staff, to listen to other IPA messages generated by parents, to share education tasks to third-party platforms and to modify an educational calendars of a student.

12. The computerized system of claim 10, wherein the IPA requires the at least one parent of the student to speak a specified password or pass phrase to access the IPA message via a parent's smart speaker system.

13. The computerized system of claim 12, wherein the memory contains instructions that when executed on the processor, causes the at least one processor to perform operations that:
 provide a feedback message to the teacher that the educational information has been played by the IPA to at least one parent.

14. The computerized system of claim 13, wherein the feedback message is delivered to the teacher's IPA dashboard.

* * * * *